Sept. 11, 1962 C. E. WILLIAMS 3,052,974

METHOD AND APPARATUS FOR MECHANICAL ALIGNMENT

Filed Jan. 14, 1960

CECIL E. WILLIAMS
INVENTOR.

BY Leonard Bogucki
Morris Spector,
ATTORNEYS

United States Patent Office 3,052,974

Patented Sept. 11, 1962

3,052,974

METHOD AND APPARATUS FOR MECHANICAL ALIGNMENT

Cecil E. Williams, Woodland Hills, Calif., assignor to Thompson Ramo Wooldridge Inc., Canoga Park, Calif., a corporation of Ohio Filed Jan. 14, 1960, Ser. No. 2,380
10 Claims. (Cl. 29—407)

This invention relates to devices and methods for precisely spatially locating mechanical elements with respect to selected reference points, and more particularly to devices and methods for precisely setting magnetic heads at predetermined angular and radial positions relative to a circumferential area on a magnetic recording surface with which the heads are to operate.

The need for precision in the fabrication of an electromechanical system is well recognized, because relatively minute mechanical errors may cause extremely large errors in electrical signals produced by the system.

A specific example illustrating the problem of establishing and maintaining a desired configuration is in a computer, wherein magnetic recording heads are employed in conjunction with a circulating storage medium, such as a rotating drum having a magnetizable surface. A number of magnetic heads may be used for each recording track on the drum, with the heads being disposed circumferentially along the track about the drum. The angular position of the heads relative to the track circumference, which may be referred to as the delay setting, is extremely critical because hundreds of recorded bits of information may be placied along each inch of the magnetic drum surface, which itself moves at a very high rate of speed. If the magnetic head is displaced only slightly from its correct position, errors occur in the recording and reproduction of information. Such errors cannot readily be compensated for by electronic circuitry or by programming techniques.

The gap between the magnetic head and the magnetic drum, which may also be referred to as the radial spacing, must be established with precision for a different but related reason. The further magnetic head is from the drum surface, the less is the magnetic coupling between the head and the magnetic surface, and the greater the likelihood of loss of signal. In addition, too much radial spacing between the head and the surface of the drum appreciably reduces the high frequency sensitivity of the magnetic head.

Various techniques have been employed in the prior art for precisely locating magnetic heads relative to a magnetic drum. The techniques heretofore available, however, have not permitted settings to be made both conveniently and rapidly. Because of the extremely close positioning which is required, a change in the position of a head in one direction almost invariably causes a change in its position in another direction. Thus, as settings are made in the angular and radial directions they must repeatedly be checked and readjusted before a final correct setting is established. Moreover, a head alignment jig which is suitable for a particular magnetic drum size or selected grouping of delay settings and radial spacings will not usually be suitable when one or more of these variables is altered. Because the ferrite materials employed in most magnetic recording heads are brittle, considerable difficulty is encountered in positioning the heads close to the drum without damaging the heads so severely that they have to be replaced because of contact during placement.

It is therefore an object of the present invention to provide an improved device and method for rapidly and accurately positioning an element in three dimensions.

Yet another object of the present invention is to provide an improved device and method for quickly positioning a number of magnetic heads both angularly and radially with respect to a circumferential reference.

A specific object of the present invention is to provide an extremely precise positioning device for separately locating individual ones of a number of magnetic heads both angularly and radially in such manner that the magnetic heads may then be mounted on a magnetic drum with which they are to be employed.

These and other objects of the present invention are achieved in accordance with the invention by a device which employs a magnifying viewer in conjunction with an air flow rate detecting element. The viewer is arranged to see through an air flow orifice which is placed in abutting relationship to a magnetic head at the position at which the head is to be located. The air flow rate through the orifice provides a measure of the radial displacement of the magnetic head from the orifice while the viewer simultaneously provides an indication of the angular displacement of the head. Therefore, positioning of the head in both the delay and radial directions is both rapid and precise. The method of the invention is in accordance with the operation of the devices employed to practice it.

A better understanding of the features of the present invention may be had by reference to the following description, taken in conjunction with the accompanying drawing, in which.

Devices and methods in accordance with the present invention are particularly suitable for the extremely precise positioning required for magnetic heads in data processing systems using magnetic recording. In order to be usable with a cyclic recording medium, such as a magnetic drum or a magnetic disc, each head must be positioned in three dimensions, that is, in the plane of a reference circumference corresponding to the recording track, angularly about the reference circumference, and radially with respect to the reference circumference. The application of the invention will be described in this context, and use in similar applications or for like purposes will be understood.

Figure 1:
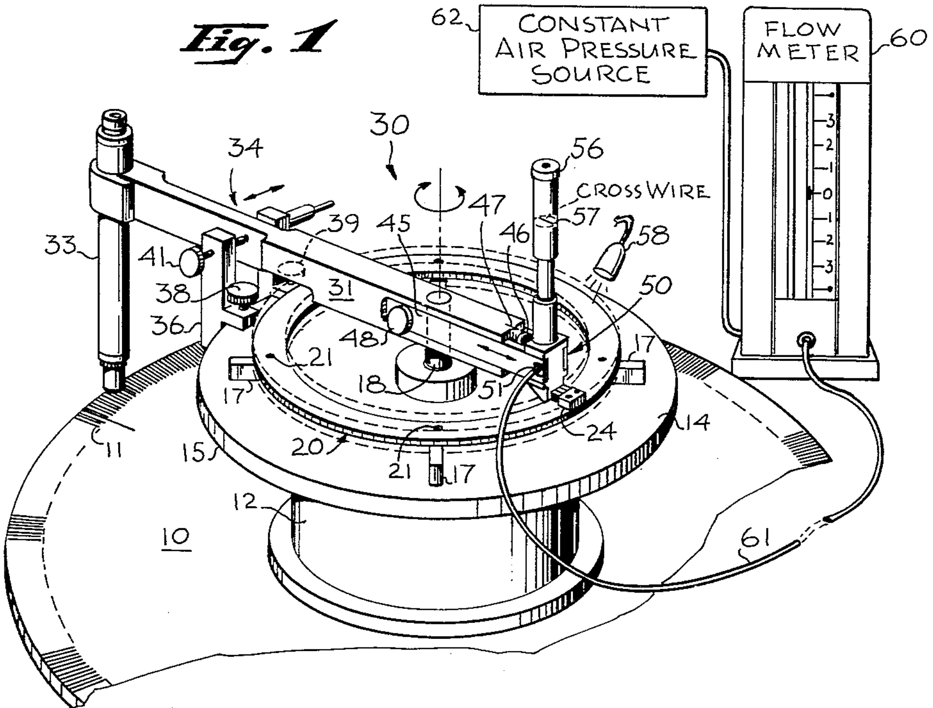
FIG. 1 is a simplified perspective view, partially broken away, of the preferred form of magnetic head positioning device employing a prism box structure.

The drum or disc with respect to which magnetic heads may be positioned is not shown in the drawing, but in each case will be of known dimensions and configuration. A substitute reference circumference is in effect provided by a stable base structure 10 (FIG. 1). The base structure 10 is mounted about a central axis which effectively simulates the axis of the drum to be employed. The base 10 includes a circumferential scale 11 containing precisely engraved or machined radially disposed marks which denote the degrees, minutes and seconds of angle about the central axis from a reference point. As previously stated, extremely fine tolerances must be observed in establishing the angular or delay setting, so that the scale 11 must define minute segments of arc. A support cylinder 12 mounted upon the base structure 10 provides a mounting for a work table 14 which defines a plane normal to the central axis of the structure, and which is concentric with the central axis. The table 14 terminates at its outer radius in an outer flange 15.

Positioning blocks 17, removably coupled to the table 14 at different points thereon, provide support and equal axial adjustment of a magnetic head mounting ring to be described below. A rotatable central shaft 18 journaled in the table 14 and extending along and concentric with the central axis provides a rotatable reference base for the remainder of the positioning mechanism. Although the shaft 18 is in this instance shown as a removable part of the base structure 10, it may in some instances be preferable to employ a shaft temporarily removed from the drum with respect to which the heads are to be positioned. If such is the case, no adjustments need be made other than in providing a journal structure which can accommodate the drum shafts.

A mounting ring 20 on which magnetic heads are to be positioned may be set level and in a predetermined angular relation on the positioning blocks 17 on the work table 14. The mounting ring 20 includes positioning holes 21 for alignment with the positioning blocks 17, and screws or other setting means not shown in detail may be used for firm attachment.

Figures 2, 3:
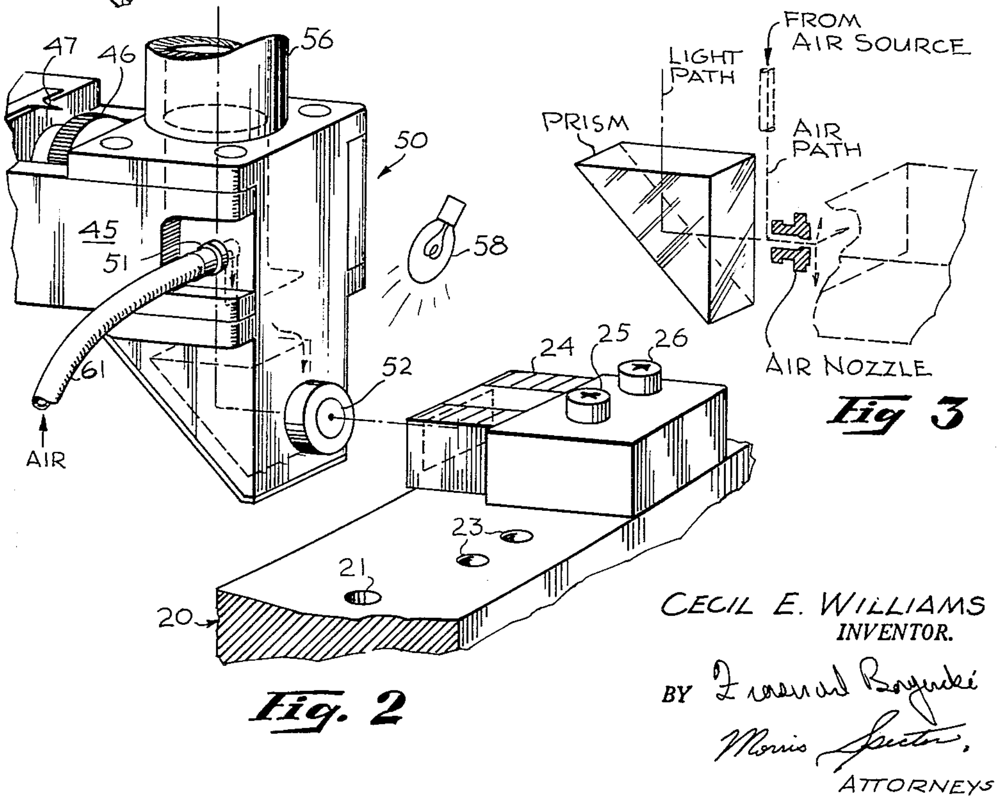
FIG. 2 is an enlarged view of a prism box structure of FIG. 1, showing the association with a magnetic head.
FIG. 3 is an enlarged simplified schematic representation of the disposition and use of certain of the elements of the prism box structure.

The manner in which magnetic heads can be set in approximate locations for final precise adjustment may best be seen in the enlarged fragmentary view of FIG. 2. As seen therein, the top (as viewed in the figure) surface of the mounting ring 20 may include pairs of tapped head setting holes 23, only one pair of which have been shown in detail. A magnetic head assembly 24 to be placed on the mounting ring 20 has apertures which are generally similarly disposed to, but slightly larger than, the head setting holes 23. With the apertures on a magnetic head assembly 24 in aproximate alignment with the holes of a single selected pair of head setting holes 23, the head assembly 24 may be fixed in position by a pair of head setting screws 25 and 26 which pass through the apertures in the magnetic head assembly 24 and are threaded to mate with the head setting holes 23. The play provided by the slightly larger apertures in the head assembly 24 permits the head to be slightly and finally adjusted while under frictional restraint from the setting screws 25 and 26.

By the use of paired head setting holes 23 on both the top and botom sides of the mounting ring 20 a great many positions are available for magnetic head assemblies 24. Although only one assembly 24 has been shown, the total number of available positions may be of the order of 100, a high percentage of which may be occupied. Note that electrical couplings have not been shown, and that the operative gap portion of the magnetic head faces radially inwardly toward the center of the mounting ring 20.

The availability of a great many different angular or delay settings, and a great many magnetic heads, permits the access time required to reach a given address on the magnetic drum to be markedly reduced, and the flexibility of the associated system to be apreciably increased. The surfaces of the mounting ring 20 permit the head assemblies 24 to be satisfactorily located laterally relative to a recording track, so that there is no magnetic coupling between adjacent tracks. Once the head assemblies 24 are precisely positioned, as described below, the entire mounting ring 20 may be removed and placed in position about a magnetic drum.

The positioning mechanism 30 by which the magnetic heads may be accurately and finally located is mounted principally upon the central shaft 18. The positioning mechanism 30 includes a delay setting arm 31 mounted on the central shaft 18, rotatable therewith, and extending normal to the chosen central axis.

A position selecting microscope 33 is mounted in the free end of a major extension of the delay setting arm 31, in line with the circumferential scale 11 on the base structure 10. The position selecting microscope 33 accordingly provides an enlarged view of the scale 11 indicia, by which the delay setting arm 31 may be located at particular delay settings.

Final setting and fine adjustment of the delay setting arm 31 is made by means of a movable fixture 34 including a bracket 36 which extends on different sides of the delay setting arm 31. The bracket 36 includes a grooved portion which registers with the outer flange of the work table 14. Set screws 38 and 39 in opposite sides of the bracket 36 may be used to fix the bracket 36 to the work table 14, so as to provide approximate location of the delay setting arm 31. A fine adjustment of the delay setting is made by an adjustment screw 41 which is threaded through the upstanding parts of the bracket 36 and the delay setting arm 31. The set screws 38 and 39 permit the delay setting arm 31 to be set approximately, and the adjustment screw 41 provides a minute adjustment of the arm 31 to a point determined by the position selecting microscope 33.

A radial setting arm 45 mounted in the lesser extension of the delay setting arm 31 permits precise adjustment for different drum sizes and head spacings. The radial setting arm 45 includes tongue portions which slide within grooves in the delay setting arm, and includes a micrometer adjustment screw 46 movable relative to a pointer 47 mounted on the arm 31. Once set, the radial setting arm 45 is held in position by a set screw 48.

A prism box structure 50 is mounted at the free end of the radial setting arm 45, the prism box structure 50 cooperating with elements by which both the delay and radial settings of a magnetic head (the operative gap portion of a head assembly 24) may be located simultaneously. The prism box 50 has a hollow interior and defines an air chamber which is substantially enclosed except for an inlet opening 51 at one side and a shaped air flow orifice or nozzle 52 at the radially outermost part of the prism box 50. If a reference line is visualized, along which the magnetic head is to be positioned and centered, the reference line constitutes a central axis for the nozzle 52. The outer surface of the nozzle 52 thus constitutes a reference surface which is arranged to be in abutting relationship to a magnetic head which is to be positioned. The prism box 50 also includes a prism 54 positioned along the reference line within the prism box 50, for diverting light passing along the horizontal reference line into a vertical direction parallel to the central axis. Thus, there is an optical path through the prism box 50, along which optical path may be viewed the area directly in front of the nozzle 52. A head setting microscope 56 is coupled to the prism box 50 and mounted concentric with the optical path extending parallel to the central axis. A reference member, such as a cross wire 57, best seen in FIG. 1, is positioned at the focal point within the optical system of the head setting microscope 56, so that the image presented at the viewing eyepiece of the microscope 56 is that of the area in front of the nozzle 52 surface, with the cross wire 57 superimposed thereon. A light 58 which may be coupled to the prism box structure 50, or to the radial setting arm 45 by means (not shown) moving with the positioning mechanism 30, operates to maintain the space directly in front of the nozzle surface 52 under illumination. While a single cross wire is shown, cross-hairs, a dot or any other retical pattern could be used. If necessary, the reticle pattern could be selected to provide a reference for adjustment of skew in any direction.

The extent of radial spacing of the gap portion of the magnetic head 24 from the nozzle 52 may be determined by a gas flow meter 60 which is coupled by a tube 61 to the inlet aperture 51 of the prism box 50. A constant source of gas pressure 62 provides a regulated gas supply for the flow meter 60, which may be of the type utilizing a floating pointer or indicator within a hollow column of gradually increasing cross-section. Any gas may be used, but air devices will be referred to, as being most convenient for the given application. The constant air pressure from the source 62 directed through the column of increasing cross-section tends to drive the floating pointer upward in the column of increasing cross-section. A bleed valve (not shown) at the top of the column permits the pointer to be set at a zero center reading for a given rate of air flow. Air flow through the tube 61 is affected by the distance of an obstruction from the nozzle 52 in the prism box 50, inasmuch as the only outlet from the flow meters 60 is through the nozzle 52. Thus, there exists within the chamber of the prism box 50 an air path, illustrated by the dotted lines in FIGS. 2 and 3, which is directed through the nozzle 52 and outwardly against the obstructing magnetic head 24. The optical light path and the air path, and their relation to the nozzle 52 and the magnetic head 24 are best illustrated in the simplified view of FIG. 3.

In the operation of this device, the mounting ring 20 is first positioned concentric with the central axis, with the ring 20 being in a plane which is normal to the central axis, as determined by the positioning blocks 17. Magnetic head assemblies 24 are then positioned in the mounting ring 20 at various peripheral openings at which delay settings are to be utilized, the magnetic head pole faces being located only approximately as to delay and radial positions. The circumferential reference line, or the assumed magnetic track location on a magnetic drum, is defined by moving the radial setting arm 45 to a position at which the outer surface of the nozzle 52 is directly at, or a selected distance apart from, the known drum radius. If the delay setting arm 31 is rotated, the nozzle 52 surface defines an arc which corresponds very closely to the drum surface. The reference line along which heads may be positioned is a radius in the plane of the mounting ring 20, which radius passes through the center of the nozzle 52.

With the nozzle 52 having a desired radial setting, the flow meter 60 may be adjusted to provide a zero indication when an obstruction (that is, a magnetic head 24) is directly in front of the nozzle 52 and at a selected radial spacing from it. Thus, a radial reference is available for all the heads. To locate a specific head, therefore, the delay setting arm 31 is rotated to a desired position.

In practice, the delay setting is made by fixing the bracket 36 to the flange 15 of the work table 14 and adjusting the fine adjustment screw 41 until the position selecting microscope 33 is referenced to a particular desired point on the circumferential scale 11. Thereafter, the head 24 may be positioned both radially and in the angular or delay direction with very close precision. The magnetic gap of the head 26 may be clearly seen in greatly enlarged form and may thus be very accurately positioned relative to the cross wire 57. To avoid problems of having the head 24 skewed with respect to the radial direction, it may be desired to employ guide means or a mounting ring configuration to insure that the head 24 is pointed directly inwardly toward the center axis. Whether or not such means are employed, simultaneous readings are available for providing quick position location. The head 24, when aligned with the cross wire 57 of the head setting microscope 56, and with the pointer of the flow meter 60 at the zero setting, must be at the desired location.

It has been found that the accuracy of the setting in both directions is within 0.0001″. To make the next setting, the movable fixture 34 need only be released and the delay setting arm 31 moved to the next selected delay position, where the procedure may be repeated.

Arrangements thus constructed avoid a number of problems heretofore encountered. Thus, there is no limitation on the number or the place of the angular or delay settings which may be made. There is no effective limitation to a single drum size. Because heads may be positioned without coming into contact with the nozzle 52 surface, the danger of scratching or breaking the heads is eliminated. Furthermore, if desired, the center shaft can be the same shaft upon which the magnetic drum itself turns. With such apparatus, only simple instructions are required to enable a person having no conversance with the operation of the magnetic drum system to make the desired adjustments both accurately and rapidly.

While there have been above described devices and methods for accurately locating magnetic heads for use with a cyclic magnetic recording system, it will be appreciated that various alternatives, modifications and variations are possible. Accordingly, the invention should be taken to include those various forms falling within the scope of the appended claims.

What is claimed is:

1. A device for accurately locating a surface in a desired spatial relation to and along a reference line comprising: means to define an optical path which is partially coextensive with the reference line; a substantially enclosed gas flow chamber disposed about said optical path and including at one side thereof an air flow orifice about the reference line and proximate to and at a selected spacing from a point along the reference line at which the surface is to be positioned; magnifying viewing means coupled optically to said chamber to view along the optical path through the orifice of said chamber, the viewing means including alignment indicia to which the location of the surface may be related during positioning; and a gas flow metering device, including a constant gas flow source, coupled to said chamber for detecting changes in the gas flow rate through said chamber which are due to the obstruction presented to gas flow by the surface to indicate thereby the spacing of the surface from the point along the reference line at which the surface is to be positioned.

2. A device for accurately locating a surface of an element spatially in three dimensions, including in combination a gas flow chamber disposed about a reference line with respect to which the surface is to be positioned, the chamber including an inlet opening and a terminal orifice lying along the reference line and having a selected proximity to the point along the reference line at which the surface is to be positioned, a light diverting element within the gas flow chamber and enclosing the end thereof which is opposite the orifice, the light diverting element lying along the reference line and providing an optical path for light directed through the orifice, a microscope optically coupled to the light diverting element and viewing the region outside the chamber through the orifice, and gas flow detecting means coupled to the chamber for ascertaining the distance of the surface from the orifice.

3. A device for accurately positioning a magnetic head at a selected location along and with a given spacing apart from a reference circumference, including in combination a member defining a hollow gas flow chamber and terminating in an orifice which is in abutting relation to the position at which the magnetic head is to be located, the chamber also including an inlet opening, a magnifying viewer including alignment indicia and coupled to the chamber to view the magnetic head optically through the orifice, and a gas flow rate indicating device coupled to the inlet of the chamber for indicating the spacing of the magnetic head from the orifice by changes in gas flow as the position of the magnetic head is also related to the alignment indicia.

4. A device for accurately locating a given surface of an element in three dimensions within a positioning zone, the device including the combination of a substantially enclosed air flow control chamber disposed about a reference line to which the surface is to be substantially normal and in a desired spatial relation, the chamber terminating along the reference line at a given point from which the surface is to be separated by a selected minute distance in an air control orifice concentric with the reference line, the chamber also including an air inlet orifice at one side thereof spaced apart from the reference line, a light refracting prism positioned within the optical chamber, the prism being positioned along the reference line and diverting light directed along the reference line through the orifice at a 90° angle, a microscope positioned concentric with the path of light diverted through the prism and adjacent to the prism, the microscope including indexing elements precisely positioned along the optical path from the orifice to provide a reference for the field viewed through the orifice, illuminating means mounted adjacent the chamber and providing illumination of that part of the surface to be positioned which is adjacent the orifice, a source of substantially constant air pressure, and an air flow rate indicating device coupled to the source of air pressure and to the inlet of the chamber and detecting the distance of the surface from the orifice through changes in the air flow rate through the chamber as the surface is moved toward or away from the orifice.

5. A magnetic head alignment device comprising an air chamber enclosure having an inlet aperture and a flow control orifice which is aligned with a reference line along which the head is to be placed, the terminal portion of the orifice being in abutting relation to the point along the line at which the surface of the head is to be positioned, an optical viewing system coupled to the chamber to receive light through the orifice and a gaseous flow rate system coupled to the inlet aperture of the chamber and providing indications of the spacing of an obstruction from the orifice.

6. A magnetic head aligning device for positioning the magnetic gap of a magnetic head at a selected point along a reference line, the device including an air flow control chamber positioned about the reference line and including a terminating orifice arranged to be positioned in abutting relation to the point along the reference line at which the magnetic gap is to be positioned, an optical viewing system positioned for viewing through the chamber and the orifice to establish the relative position and attitude of the magnetic head with respect to the reference line, and an air flow detecting mechanism coupled to the chamber and detecting the spacing along the reference line of the magnetic head from the terminating orifice.

7. A method of precisely positioning a number of magnetic heads in a mounting ring so that each of the heads has a selected angular and radial disposition relative to a magnetic recording member which can be rotatably positioned within the mounting ring, the method including the steps of positioning each of the magnetic heads at an approximate location desired for the head in the mounting ring, viewing each magnetic head individually in magnified form along a reference line on which the head is to be positioned while simultaneously ascertaining the position of the magnetic head along the reference line by employing the magnetic head as an obstruction to a controlled gas flow jet, and firmly mounting the magnetic head in position when its lateral disposition relative to the reference line and position along the reference line are as desired.

8. A device for precisely selecting the angular delay and radial spacing settings for a number of magnetic heads held in a mounting device at positions in a circumferential region relative to a rotating magnetic device about which the mounting device may be placed and including a rotatable central member upon which the mounting device may be concentrically disposed, means coupled to the central member for precisely angularly positioning the central member at different delay settings at which magnetic heads are to be mounted, viewing means mounted on the central member and including alignment indicia, the viewing means being optically coupled to the circumferential region for providing a magnified optical representation of the position of a magnetic head, held in the mounting device at a particular delay setting the viewing means including a gas flow chamber terminating in a nozzle surface proximate to the magnetic head, a gas source coupled to the gas flow chamber and providing a gas flow through the nozzle against the magnetic head held in the mounting device at the particular delay setting, and flow meter means coupled to the gas flow chamber for ascertaining the radial spacing of a magnetic head from the nozzle surface by detecting variations in the gas flow due to the obstruction presented by a magnetic head.

9. A device for precisely setting each of a number of circumferentially disposed magnetic heads held in a mounting ring so that each of the heads is positioned to have a precisely determined delay and radial spacing when operatively associated with a rotating magnetic drum about which the mounting ring is positioned, the device including means including a central shaft for maintaining the mounting ring concentric with the shaft in a position corresponding to the location of the mounting ring relative to a magnetic drum, a circumferentially marked reference ring lying in a plane substantially parallel to the plane of the mounting ring and concentric with the central shaft, a support arm coupled to and extending from the central shaft and rotatable therewith in a plane parallel to the plane of the mounting ring, a position selecting microscope coupled to the support arm and mounted normal thereto in line with the reference markings of the reference device, an enclosed chamber coupled to the support arm and extending along a reference line constituting a radius from the central shaft axis, the chamber terminating at its outer radial limit in an air flow control nozzle having an outer nozzle surface, a microscope device coupled to the chamber in a direction substantially normal to the reference line extending through the orifice, means within the optical chamber for reflecting light directed through the orifice in the direction of the microscope, means coupling the chamber and the microscope to the support arm for adjustably radially moving the chamber relative to the support arm, a constant air pressure source coupled to the chamber, and an air flow rate meter coupled to the chamber and detecting changes in the passage of air through the chamber in accordance with presence and distance of an obstruction from the outer nozzle surface of the control nozzle.

10. A device for radially and angularly aligning magnetic heads relative to a selected periphery, the device including the combination of a magnetic head mounting ring having a plurality of positions at which magnetic heads may be set at approximate locations, with the pole faces of the magnetic heads being directed radially inwardly with respect to the mounting ring, a central base structure including a rotatable central shaft corresponding to the shaft of a magnetic drum to be utilized, the base structure also including means for maintaining the mounting ring about the central shaft and concentric therewith, a delay setting arm coupled to the central shaft and normal thereto at a point spaced apart from the mounting ring, a delay marking scale including delay indicia disposed concentric with the central shaft, a first magnifying viewer mounted on the delay setting arm at a radius from the central shaft corresponding to the radius at which the delay indicia are provided, and disposed in a direction to view the delay indicia, a second magnifying viewer mounted on the arm at a radius inwardly disposed from the magnetic heads and at an angle normal to the plane of the mounting ring, a prism housing structure coupled to the objective end of the second magnifying viewer and providing an optical light path from an associated magnetic head position to the second magnifying viewer, the prism housing structure including at its end adjacent the magnetic heads an air flow control chamber with an inlet opening at one side thereof and an outlet opening including a flow nozzle in the line of the optical path to an associated magnetic head from the second magnifying viewer, and an air flow rate detecting device coupled to the inlet opening of the prism housing structure and indicating the extent of the radial spacing between the flow nozzle and the adjacent magnetic head, whereby the head may be adjusted as to delay by selecting a precise angular position of the setting arm with the first magnifying viewer and altering the position of the associated magnetic head both radially and as to delay in accordance with the indication simultaneously available at the second magnifying viewer and the air flow rate detecting device.

References Cited in the file of this patent

UNITED STATES PATENTS

| | | |
|---|---|---|
| 2,079,791 | Cook | May 11, 1937 |
| 2,342,828 | Armitage | Feb. 29, 1944 |
| 2,431,087 | Subber | Nov. 18, 1947 |
| 2,563,780 | Fontaine | Aug. 7, 1951 |